United States Patent
Strothmann et al.

(10) Patent No.: US 6,974,079 B1
(45) Date of Patent: Dec. 13, 2005

(54) METHODS AND APPARATUS FOR PREDICTING AIRLINE SEAT AVAILABILITY

(75) Inventors: Russell L. Strothmann, Broken Arrow, OK (US); Gary J. Potter, Hurst, TX (US); Stanislav Brezina, Dallas, TX (US)

(73) Assignee: Sabre, Inc., Southlake, TX (US)

( * ) Notice: Subject to any disclaimer, the term of this patent is extended or adjusted under 35 U.S.C. 154(b) by 707 days.

(21) Appl. No.: 09/697,645

(22) Filed: Oct. 27, 2000

(51) Int. Cl.[7] ............................................. G07B 15/02
(52) U.S. Cl. ........................... 235/384; 235/380; 705/5
(58) Field of Search ............................... 235/380, 385, 235/384; 705/5–8, 22, 28, 6, 13

(56) References Cited

U.S. PATENT DOCUMENTS

| | | | | |
|---|---|---|---|---|
| 5,237,499 A | * | 8/1993 | Garback ........................ | 705/5 |
| 5,331,546 A | * | 7/1994 | Webber et al. ................. | 705/6 |
| 5,978,770 A | * | 11/1999 | Waytena et al. ............... | 705/5 |
| 6,418,413 B2 | * | 7/2002 | DeMarcken et al. .......... | 705/5 |

OTHER PUBLICATIONS

Belobaba, Peter, Application of a Probabilistic Decision Model to Airline Seat Inventory Control, Mar./Apr. 1989, Operations Research, Col. 37 Issue 2, p183, 15p.*

* cited by examiner

Primary Examiner—Diane I. Lee
Assistant Examiner—Lisa M. Caputo
(74) Attorney, Agent, or Firm—Alston & Bird LLP

(57) ABSTRACT

Systems predict the availability of travel resources and select an appropriate data source for obtaining travel resource inventory availability information by analyzing historical travel resource availability data. Such systems receive customer travel requests and determine candidate itineraries. The candidate itineraries are used to determine the probability that the candidate itineraries will remain available for certain periods of time based on historical availability information and fare rules. Such systems increase the reliability of booking travel itineraries by determining when it is necessary to obtain updated availability information. The systems make this determination by looking up candidate itineraries in a situation table calculated from historical availability information.

12 Claims, 4 Drawing Sheets

Availability Predictor

You have selected the following itinerary for one person                     200

| Selected Airline | Flight Number | Departure Date | Departure City | Departure Time | Arrival City | Arrival Time |
|---|---|---|---|---|---|---|
| American | 1665 | March 29, 2000 | Cincinnati | 8:00AM | Dallas/Ft. Worth | 9:44AM |
| American | 1422 | April 6, 2000 | Dallas/Ft. Worth | 8:00AM | Dallas/Ft. Worth | 12:20PM |

These flights are available for booking today for a total cost of $380.00.

— 210

Analysis of booking patterns for these flights indicates the following
Probability these flights will close within the stated time period from today.

| | |
|---|---|
| 2 Days | 30% |
| 4 Days | 50%  — 220 |
| 7 Days | 80% |

All fares are subject to change at any time and are not guaranteed until purchased and ticketed.

Fig. 2

METHODS AND APPARATUS FOR PREDICTING AIRLINE SEAT AVAILABILITY

FIELD OF THE INVENTION

This invention relates generally to methods and systems for predicting availability of a given inventory resource. In particular, the present invention comprises a method and system for predicting the future availability of a travel inventory resource given historical inventory data. The present invention also comprises a method and system for increasing reliability of booking airline travel itineraries by optimal use of inventory data sources.

BACKGROUND OF THE INVENTION

In the travel industry, customers wishing to purchase tickets for travel generally begin by placing a request for a particular travel itinerary, either personally using an on-line or telephone-based reservation system or through a travel agent or travel provider. The customer's travel request may include, for example, proposed dates, departure location, and arrival location. In response, the customer is typically presented with a proposed itinerary and quoted the current price for the proposed itinerary. At this point, the customer generally must make a decision whether to purchase the ticket immediately. Customers wishing to wait before committing to the purchase may opt to place the ticket on hold, which, if the option is available, allows the customer to reserve the specific itinerary for a short period, typically 24 hours, with no guarantees that the price be the same at time of purchase. In a volatile travel market, ticket prices for travel, particularly for airline travel, are adjusted frequently, often several times in a single day, adding great uncertainty to placing a travel itinerary on hold.

Customers may want to place travel reservations on hold for a variety of reasons. Customers may need to first verify travel plans and coordinate travel with another party. Some customers may wish to wait and see if a preferred itinerary becomes available. Customers for whom price is a concern may want to wait and see if the travel price decreases. Once a ticket is purchased, however, the customer must often pay fees to cancel or change the itinerary.

Conventional systems, however, typically allow customers to place an itinerary on hold for only a limited time period, such as 24 hours. Placing an itinerary on hold in the conventional fashion may provide the customer with an extra day of flexibility but, after this brief time has lapsed, the customer is once again faced with immediately purchasing the ticket or again placing the itinerary on hold. Using conventional travel reservation systems, such as SABRE, EDS', System One, Covia, World Span, and proprietary reservation systems run by airlines, customers are not provided with information regarding the likelihood that a preferred travel itinerary will remain available for booking in the future. Travel providers, travel agents and other booking agents would also like to be able to offer this information to customers that seek advice regarding this decision about whether to make an immediate purchase or to defer the decision to purchase.

Travel providers face a related problem. Travel providers seek to maximize revenue by selling all available seats in the travel resource, such as a plane, train, or bus. To facilitate maximum revenue, travel providers typically offer seats in the travel resource in various "booking classes," which vary, for example, in price, availability, and restrictions. Airlines, for example, offer seats on an airplane within Passenger Name Record ("PNR") booking classes, such as "Y," "Q," and "L," to name a few. A ticket in "Y" class, for example, may be a full fare coach ticket with no restrictions as to when it can be booked or whether it can be changed. Tickets in "L" class, however, while offered at a significantly reduced fare price, may require a 14-day advance purchase. Similarly, tickets in "Q" class might support a fare rule that requires only a three-day advance purchase.

Since travel providers, such as airlines, seek to make use of all available seats, while maximizing sales of the higher revenue tickets, the providers tend to offer fewer seats in each of the descending classes. For instance, if there were three classes "Y," "Q," and "L" for a flight on an airplane having 100 seats, an airline might initially offer 100 seats in "Y" class, 50 seats in "Q" class, and 25 seats in "L" class. By doing so, the airline is not offering 175 seats, but rather indicating a preference for the higher revenue classes, so that as tickets are purchased, and the travel resource begins to fill up, the remaining seats will always be in the higher classes. As each ticket is sold, the number of available seats in each class is reduced by one to ensure that lower revenue tickets are not sold at the expense of the higher revenue tickets. Continuing with the above example, it would be possible for all of the 100 "Y" class tickets to be sold, but there will be a maximum of 50 and 25 sold in the "Q" and "L" classes, respectively. Once the lower revenue classes are sold, those persons needing to travel will have to purchase the higher-revenue tickets. Similarly, on those flights that are not full, the opportunity to purchase lower priced tickets will ideally maximize ticket sales because of the discounted prices.

Electronic reservation systems, such as SABRE, allow travel providers, travel agents, and other booking services to all book and reserve seats essentially simultaneously. While seats are being booked and reserved by multiple services essentially simultaneously, it becomes a challenge to maintain accurate records of the number of remaining seats in each class. A particular airline will presumably have accurate records of seat availability for its own flights, but depending on how a central reservation service obtains its seat availability information, the central reservation service's information may not be perfectly synchronized with actual seat availability.

In the airline industry, central reservation systems employ at least two different models for updating the inventory of available seats. Using an Availability Status model ("AVS"), a central reservation system periodically accesses the host computers of travel providers, checks inventory for all travel resources, and stores the information locally. When the central reservation system receives a request to check availability for a certain travel resource, the system simply returns a result based on the local information that has been stored since the most recent check. Since a reservation system typically incurs charges each time it accesses a database, using AVS is cost efficient because, in the AVS system, remote databases with associated access charges are accessed only periodically. Using AVS may be unreliable, however, because a certain travel resource may sell out between system updates, thereby causing overbooking, or a seat may become available unbeknownst to the reservation system, thereby resulting in a lost sale.

By contrast, central reservation systems using the method of Direct Connect Availability ("DCA") do not suffer from this potential unreliability, however they are significantly more expensive. These systems do not store information locally, but rather connect directly to an airline's seat availability database with every customer request. Therefore, central reservation systems using DCA are potentially more accurate than systems using AVS because the seat availability information is always current. Using DCA, however, is more expensive than AVS because the DCA system accesses databases more frequently than AVS and therefore generates more access fees than AVS.

Thus, the ideal balance between cost and benefit would be to use AVS except when it would be sufficiently likely to create a lost a sale or an over booking. The problem is that there is currently no available technology to determine when it is safe to use AVS and when it is sufficiently important to use DCA.

SUMMARY OF THE INVENTION

In accordance with the invention, methods and systems consistent with the present invention overcome the shortcomings of existing systems by predicting travel resource availability. Such methods and systems first obtain a candidate itinerary. The method then determines a probability that the candidate itinerary will remain available for booking for a period of time, and then outputs the probability. The method may obtain the candidate itinerary by receiving a customer request for travel, and selecting from a list of flights a candidate itinerary that satisfies the customer request.

The method may determine the probability by calculating the probability that the client itinerary will be available based upon historical availability information. The method may determine when the candidate itinerary will become unavailable for booking based on fare rules. The method may output a probability by predicting when the itinerary will become unavailable after a lower-priced itinerary has become unavailable. The method may calculate the probability by predicting when the itinerary will close in relation to a flight departure date. The method may also calculate the likelihood that an unavailable itinerary will become available again.

A method consistent with the present invention increases the reliability of booking airline travel itineraries by obtaining a candidate itinerary including availability information and determining whether the availability information should be updated based on the candidate itinerary.

A method consistent with the present invention may select an availability source by obtaining availability information from at least two sources, determining differences between the availability information from the sources, and discarding availability information rendered irrelevant by fare rules.

BRIEF DESCRIPTION OF THE DRAWING

For a more complete understanding of the present invention and its advantages, reference is made to the following description in conjunction with the following drawings in which:

FIG. 2 illustrates an exemplary output of a method consistent with the present invention.

DETAILED DESCRIPTION

The present invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Reference will now be made in detail to an implementation consistent with the principles of the present invention as illustrated in the accompanying drawings.

Wherever possible, the same reference numbers will be used throughout the drawings and the following description to refer to the same or like parts.

Figure 1:
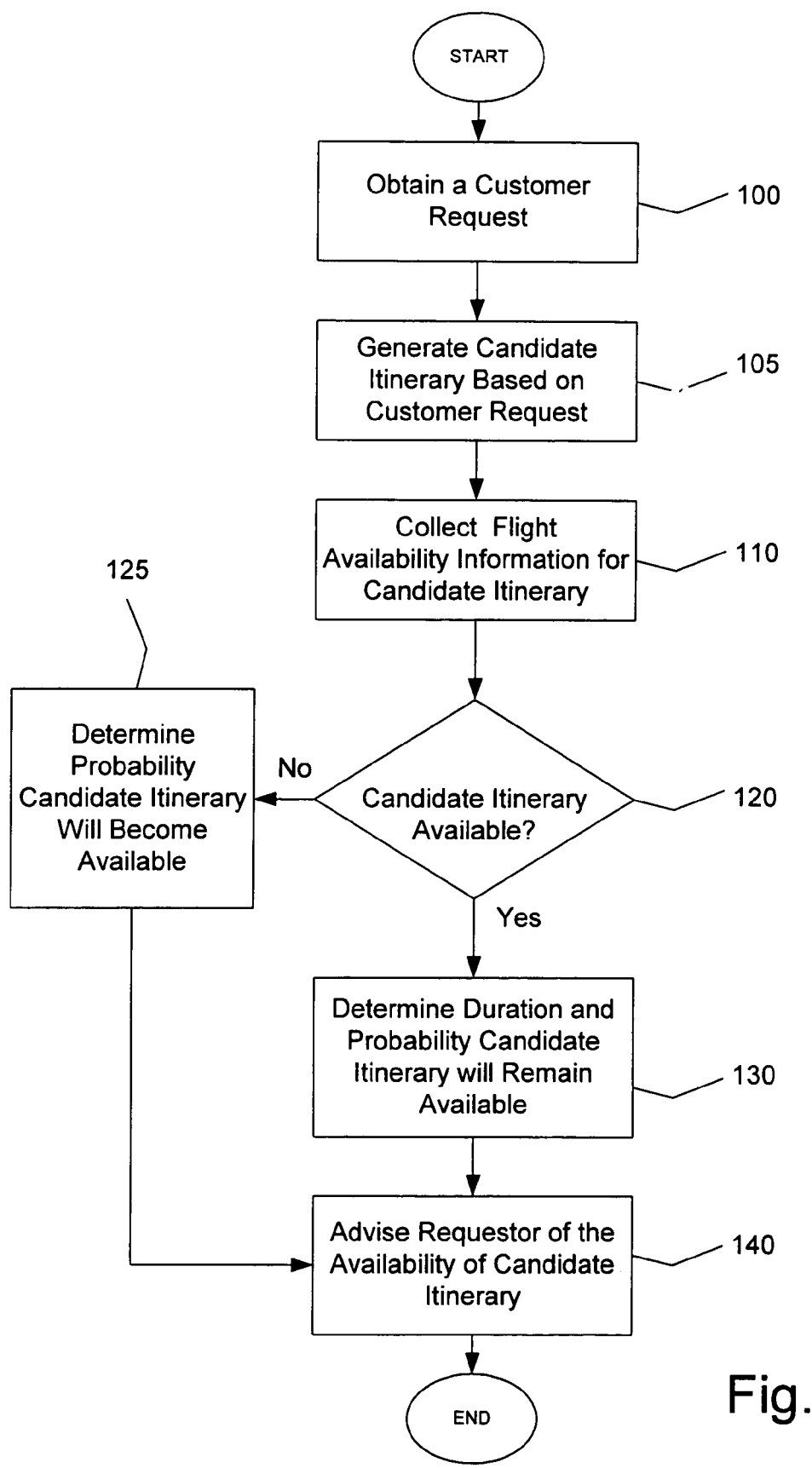
FIG. 1 shows the steps of predicting the availability of a travel itinerary consistent with the present invention.

FIG. 1 shows the steps of predicting the availability of a travel itinerary consistent with the present invention. The process of predicting availability is initiated by obtaining a customer request (step 100). This request can be obtained via several channels including talking to a travel agent, accessing an on-line reservation system such as Sabre or American Airlines, or via other modes of correspondence. A customer request includes, for example, the desired departure location, arrival location, and number of passengers. A customer request may optionally include a desired date or date ranges, flight times, PNR booking class, airlines, airports or price range.

In step 105, one or more candidate itineraries are generated based on the customer request. A candidate itinerary is a specific flight that meets the customer request requirements, such as, for example, a specific airline and flight number on a specific date. A flight number represents a distinct departure time and arrival time at distinct airports, and may or may not include stops.

Next, for each candidate itinerary, availability information is collected from conventional global distribution systems (GDS) such as Sabre, World Span, Amadeus and Galileo (step 110). For each flight, the GDS typically provides the number of seats that are currently available for booking within each fare class. Next, each candidate itinerary is compared to the number of currently available seats within each class to determine whether there are adequate seats in any of the booking classes to satisfy the customer request (step 120), i.e., whether the candidate itinerary is available.

If the availability information indicates that there are sufficient currently available seats to book the candidate itinerary, the probability that the candidate itinerary will continue to be available for the number of passengers requested by the client is determined (step 130). In one embodiment consistent with the present invention, the probability that a candidate itinerary will remain open is predicated by looking up the candidate itinerary in a probability table that represents a historical percentage of instances that the flight in the candidate itinerary remained open for certain periods of time. Thus, in step 130, the candidate itinerary may be compared to entries in the probability table to determine the duration and probability the candidate itinerary will remain open. Based upon this comparison step, the number of days and percentage probability that the candidate itinerary will remain available may be determined.

A probability table consistent with the present invention may be generated by computing the percentage of times the flight remained open under other similar situations. For example, if a candidate itinerary comprises an airline and flight number, a probability table consistent with the present invention may contain, for example, percentages representing the number of times that the same airline and flight number in previous situations closed one week before departure, three days before departure, and one day before departure.

If the availability information indicates that there are not sufficient currently available seats to book the candidate itinerary, the probability that the candidate itinerary will become available for the number of passengers requested by the client may be determined (step 125). In one embodiment consistent with the present invention, the probability that a candidate itinerary will become available may be determined by accessing a probability table that represents a historical percentage of instances that the desired number of seats in the requested booking class for the flight in the candidate itinerary became available after being closed. As such, a probability table consistent with the present invention may indicate, for example, the likelihood that a currently-closed booking class will reopen. In the airline industry, it is quite common to adjust the inventory of available seats based on booking demand. If a currently closed booking class is on a flight that still has many seats remaining, for example, the airline may reopen the booking class by adding available seats to the inventory of that booking class. By analyzing the past trends of reopening booking classes based on the current state of availability, it is possible to reasonably predict whether the class will reopen within a certain period of time such as, for example, the next 7 days. In other embodiments, the candidate itinerary may be discarded if the availability information indicates that there are not sufficient currently available seats to book the candidate itinerary.

The process described above is repeated for each candidate itinerary. Finally, the availability and probability information is provided to the customer in step 140.

FIG. 2 is an example of the output to the customer. Section 200 shows a candidate itinerary and section 210 indicates the cost of the candidate itinerary. Section 220 indicates the number of days and percentage probability that the candidate itinerary in section 200 will remain available for booking.

Figure 3:
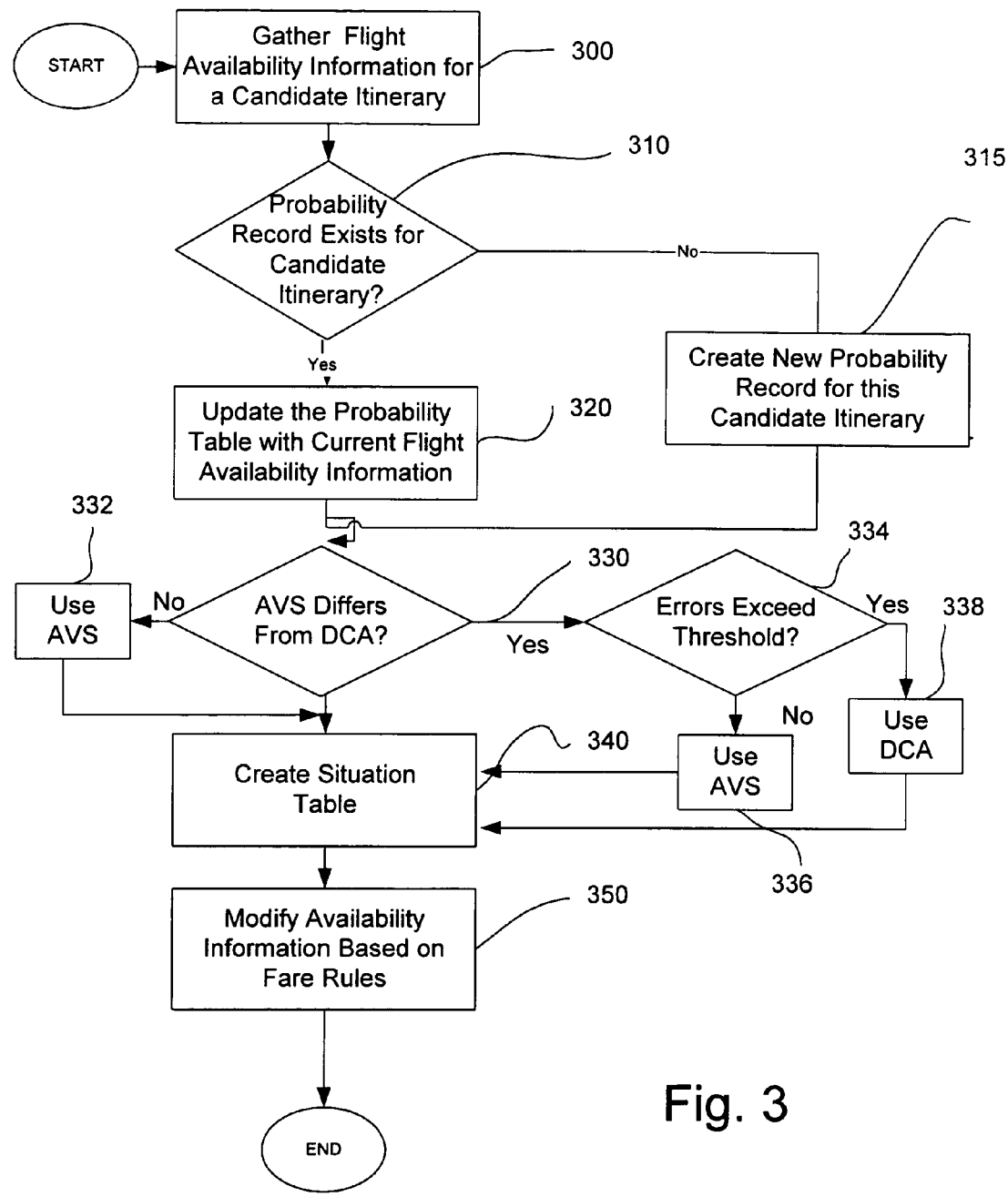
FIG. 3 shows the steps of a method for generating probability and situation tables based upon past availability information consistent with the present invention.

FIG. 3 shows the steps of a method for generating probability and situation tables based upon past availability information consistent with the present invention. In one embodiment of the present invention, a situation table contains candidate itinerary parameters (e.g. airline, flight number, number of passengers and day of week) for which an analysis of historical availability information has indicated current availability information must be obtained prior to booking. For example, in step 300, flight availability information is collected for multiple candidate itineraries. For each candidate itinerary, the system queries the probability table in the database. In step 310, if a probability record is found with matching candidate itinerary parameters, the probability is updated based upon the currently collected availability information (step 320). If a record is not found in the probability table, a new probability record is created (step 315).

In step 330, the method compares the AVS and DCA data for the candidate itinerary to determine differences in availability information. For each booking class, the method compares the AVS data for that class with the corresponding DCA data. For illustrative purposes only, the method is explained with reference to the availability data in Example 1 shown below. Example 1 shows AVS and DCA availability information for a candidate itinerary ten days prior to departure. In each two letter/number combination, the letter represents a booking class while the number represents the number of currently available seats that the data source type (AVS or DCA) is showing.

EXAMPLE 1

| Test date: | Ten days prior to departure. |
|---|---|
| In AVS: | Y7 B7 H7 Q7 K7 L4 N0 T0 |
| In DCA: | Y7 B7 H7 Q7 K5 L2 N0 T0 |

In Example 1, comparing the AVS and DCA data for class K reveals a difference of two seats, as does a comparison of available seats in class L. If, for example, a customer requests three seats in L class, the AVS data would indicate that a candidate itinerary with three seats is available for booking, while DCA data indicates that the flight is already too full to accommodate the candidate itinerary. A difference would also occur when AVS indicates that the client itinerary cannot be satisfied for lack of available seats, but DCA indicates that adequate seats have become available. If comparison of the AVS and DCA data indicates that the AVS data does not differ from the DCA data, there is no need to update the data with DCA information (step 332). If, however, the AVS data is different than the DCA data, generally, when faced with this candidate itinerary, the reservation system should obtain more current availability information using DCA before booking the candidate itinerary. The situation table created at step 340 for that candidate itinerary therefore indicates that DCA information should be obtained.

In one embodiment of the present invention, even if a difference is detected, DCA data will be used when an error threshold is exceeded. In this event, if a difference between AVS and DCA data is detected, it is first determined whether the difference exceeds an error threshold, such as, for example, 98% (step 334). If the error threshold is exceeded, this candidate itinerary is annotated in the situation table as one when DCA availability information should be obtained before booking (step 338). If the error threshold is not exceeded, the situation table may indicate that use of AVS data is sufficiently accurate (step 336).

In another embodiment of the present invention, the situation table will indicate that AVS data may be relied upon with sufficient accuracy and that updating with DCA data is not warranted. For example, AVS data may be used when the availability data forms a downward progression, that is, the availability decreases as the class level decreases. Where the data forms a downward progression, certain predictions can be reliably made based on the AVS data. For example, if all the classes lower than class K have been closed or rendered irrelevant by the fare rules, generally class K will soon close as well and it is not necessary to check the data using DCA. These special situations may be reflected in the situation table.

In step 350, the situation table is modified based on fare rules. For example, booking class L may require a 14-day advance purchase. In Example 1, however, the candidate itinerary has been requested only ten days in advance of departure. In this case, it does not matter that the DCA data may be more accurate because class L cannot be booked. In this case, the situation table will indicate that AVS data is sufficient.

In creating the situation tables, accounting for passenger impact is another major consideration. An incorrect booking that involves four passengers, for example, has more overall effect than one that involves only a single passenger.

Figure 4:
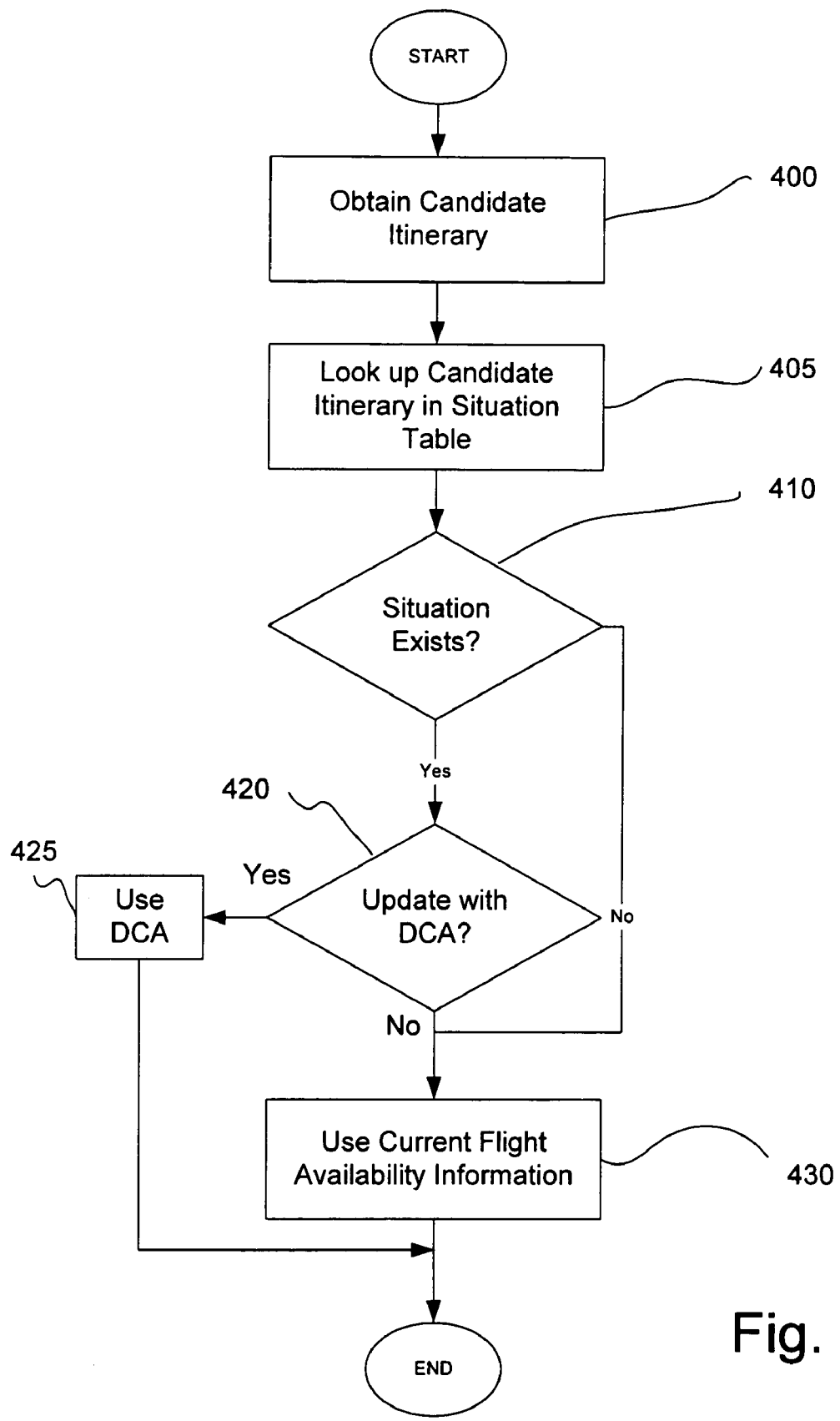
FIG. 4 is a flow diagram illustrating the steps of a method for increasing reliability of booking airline travel itineraries.

FIG. 4 is a flow diagram illustrating the steps of a method for increasing reliability of booking airline travel itineraries based on number of passengers. The system begins by obtaining a candidate itinerary (step 400). In step 405, a reservation system implementing the methods of the present invention looks up the candidate itinerary in a situation table consistent with the present invention to determine whether a situation similar to the candidate itinerary exists in the situation table (step 410). If a situation similar to the candidate itinerary exists, the situation table will indicate whether the availability information for this candidate itinerary should be updated prior to booking. If the situation table indicates that DCA should be used (step 420), the availability information for this candidate itinerary is updated using DCA (step 425). If it indicates that updating will not increase reliability, the current flight availability information is used (step 430).

Modifications of this invention will occur to those skilled in the art. Therefore it is to be understood that this invention is not limited to the particular method and system disclosed, but that it is intended to cover all modifications which are within the scope of this invention as claimed.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for increasing reliability of booking airline travel itineraries comprising the steps of:
    obtaining a candidate itinerary including availability information;
    creating a situation table based upon availability data for the candidate itinerary from each of at least two data sources, the situation table comprising sample itineraries and historical availability information, wherein creating a situation table comprises:
        obtaining availability information from at least two data sources based on the candidate itinerary;
        determining a difference between the availability information from the at least two sources; and
        storing in the situation table an indication that the availability information should be updated prior to booking, wherein the indication is based on the difference; and
    determining whether the availability information should be updated based on the candidate itinerary and the situation table.

2. The method of claim 1 further comprising:
    dynamically updating the situation table based on the availability information.

3. The method of claim 1, wherein the storing step further comprises:
    storing in the situation table an indication that the availability information should be updated prior to booking but only when the candidate itinerary is not rendered irrelevant by fare rules.

4. The method of claim 1 wherein the storing step further comprises:
    storing in the situation table an indication that the availability information should be updated prior to booking but only when a difference between the availability information from the at least two sources exceeds an error threshold.

5. A system for increasing reliability of booking airline travel itineraries implemented on a computer, the system comprising:
    means for obtaining a candidate itinerary including availability information; and
    means for creating a situation table based upon availability data for the candidate itinerary from each of at least two data sources, the situation table comprising sample itineraries and historical availability information, wherein creating a situation table comprises:
        obtaining availability information from at least two data sources based on the candidate itinerary;
        determining a difference between the availability information from the at least two sources; and
        storing in the situation table an indication that the availability information should be updated prior to booking, wherein the indication is based on the difference; and
    means for determining whether the availability information should be updated based on the candidate itinerary and the situation table.

6. The system of claim 5 further comprising;
    means for dynamically updating the situation table based on the availability information.

7. The system of claim 5, wherein the means for storing further comprises:
    means for storing in the situation table an indication that the availability information should be updated prior to booking but only when the candidate itinerary is not rendered irrelevant by fare rules.

8. The system of claim 5, wherein the means for storing further comprises:
    means for storing in the situation table an indication that the availability information should be updated prior to booking but only when a difference between the availability information from the at least two sources exceeds an error threshold.

9. A computer-readable medium containing instructions for causing a computer to perform a method of increasing reliability of booking airline travel itineraries comprising the steps of:
    obtaining a candidate itinerary including availability information from an itinerary generation element in communication with an availability data source; and
    creating a situation table based upon availability data for the candidate itinerary from each of at least two data sources by a processing element, the situation table comprising sample itineraries and historical availability information, wherein creating a situation table comprises:
        obtaining availability information from at least two data sources based on the candidate itinerary;
        determining a difference between the availability information from the at least two sources; and
        storing in the situation table an indication that the availability information should be updated prior to booking, wherein the indication is based on the difference; and determining whether the availability information should be updated based on the candidate itinerary and the situation table.

10. The computer-readable medium of claim 9 wherein the method further comprises the step of:
dynamically updating the situation table based on the availability information.

11. The computer-readable medium of claim 9, wherein the storing step further comprises:
storing in the situation table an indication that the availability information should be updated prior to booking but only when the candidate itinerary is not rendered irrelevant by fare rules.

12. The computer-readable medium of claim 9, wherein the storing step further comprises:
storing in the situation table an indication that the availability information should be updated prior to booking but only when a difference between the availability information from the at least two sources exceeds an error threshold.

* * * * *